United States Patent Office 3,128,643
Patented Apr. 14, 1964

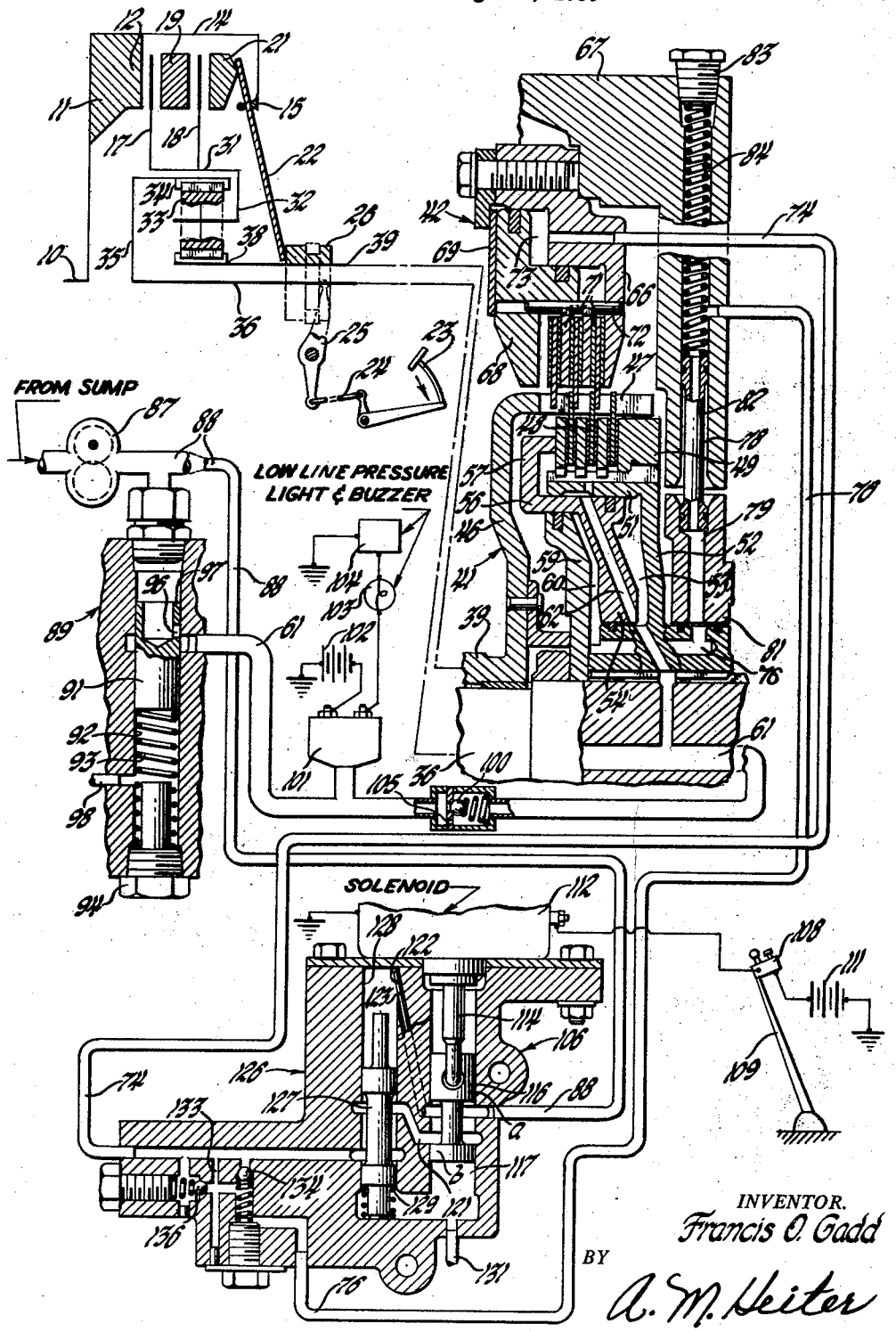

3,128,643
TRANSMISSION
Francis O. Gadd, Birmingham, Mich., assignor to General Motors Corporation, Detroit, Mich., a corporation of Delaware
Filed Aug. 20, 1959, Ser. No. 835,090
26 Claims. (Cl. 74—781)

This invention relates to a transmission control system and more particularly to a main clutch and two-speed transmission unit and control system.

The main clutch and transmission unit has a two-plate main clutch driving the carrier of a planetary gear set which has a ring gear connected to the output shaft. The sun gear is controlled by a direct drive clutch and an overdrive brake to provide direct drive or overdrive. The brake is spring applied and pressure released while the clutch is pressure applied and released by a hydraulic biasing force supplied by lubricating pressure and centrifugal force. The control system employs a solenoid operated valve to direct fluid to release the brake and after a timed interval engage the clutch. The system includes, between the solenoid operated valve and the clutch and brake motor, a pressure responsive valve which prevents the flow of actuating fluid to release the brake and apply the clutch unless a predetermined pressure value is available to insure proper operation.

An object of the invention is to provide in a control system for a fluid operated ratio engaging device, having a source of fluid pressure controlled by a shift valve controlling the supply of fluid to the ratio engaging device, a pressure operated valve located between the shift valve and the fluid pressure operated device to prevent the supply of fluid to the fluid pressure operated device unless the fluid pressure is above the predetermined value.

Another object of the invention is to provide in a transmission having a first spring applied and pressure released drive and a second pressure engaged drive in which a shift valve controls the supply of fluid pressure to both drives to disengage the first drive and engage the second drive, a pressure responsive valve located between the shift valve and the drives to block the flow of fluid to the drive engaging devices unless the pressure is above a predetermined value.

Another object of the invention is to provide in a transmission having a first spring applied and pressure released drive and a second pressure engaged drive in which a shift valve controls the supply of fluid pressure to both drives to disengage the first drive and engage the second drive, a control to restrict the flow to the second fluid operated drive device to a low flow rate until the first pressure released drive is disengaged and to engage the second drive when the engine speed has changed in an amount equal to the ratio change.

These and other objects of the invention will be apparent from the following description and drawing illustrating a preferred embodiment of the invention.

The drawing diagrammatically illustrates the transmission drive arrangement and the control system therefor.

The transmission is preferably employed in place of the main clutch unit normally located between an engine and a manual transmission of the sliding gear type. This unit provides in this location conventional main clutch operation and a two-speed unit without increasing the length of the engine and transmission power plant assembly. Referring to the drawing the input shaft 10 driven by the engine in a conventional manner drives the flywheel 11 which has a conventional fixed clutch plate portion 12 and a clutch member 14 mounted on or integral with the flywheel and supporting the clutch fulcrum 15. The clutch driven plates 17 and 18 are located between the driving plates, the fixed plate 12, the intermediated plate 19 and the pressure plate 21. The Belleville clutch apply spring 22 is pivoted on the fulcrum 15 and normally biases the pressure plate 21 and the intermediate plate 19 through driven plate 18 to engage both driven plates 17 and 18. Movement of the clutch pedal 23 as shown by the arrow actuates the link 24 and lever 25 to move the throw-out bearing 26 to the left to release the main clutch.

The clutch driven plates 17 and 18 have a splined connection to the outer portion 31 of the carrier 32. The carrier 32 has planetary pinions 33 meshing with a ring gear 34 connected by a hub 35 to the output shaft 36 and a controlled sun gear 38 connected by a control shaft 39 to the ratio establishing devices or the clutch 41 and brake 42.

The control shaft 39 is connected by the clutch 41 to the output shaft 36 to provide direct drive or held by the brake 42 to establish overdrive. The control shaft 39 terminates in a control hub 46 having a splined control drum 47. The clutch 41 has a plurality of plates 48 with alternate plates splined to the control drum 47 and intermediate plates and the fixed abutment 49 splined to the cylindrical portion 51 formed on the hub 52 secured to the output shaft 36. The hub 52 has an internal annular cavity 53 forming a cylinder for the piston 54. The piston 54 has a cylindrical extension 56 contacting the outer cylindrical portion 51 of the cylinder having a presser foot 57 to engage the clutch plates 48. The other end of the cylinder 53 is closed by a closure plate 59 to provide an expansible chamber on both sides of the piston 54. Lubricating fluid is supplied through the lubricating line 61 to the right side of piston 54 to provide a hydraulic biasing force. The right portion of cylinder 53 is at all times connected by line 62 to vent and to lubricate the clutch and brake plates so that the pressure in the right chamber or biasing chamber is only equal to the centrifugal pressure head of the fluid filling the chamber.

The brake 42 consists of a fixed abutment 66 secured to the housing 67 and a pressure plate normally biased to a brake engaged position by the Belleville spring 69 to engage the brake plates 71. Alternate plates are splined to the control drum 47 and intermediate plates are splined by the pin 72 to the fixed abutment 66. The pin 72 also prevents rotation of pressure plate 68. The fixed abutment 66 and the pressure plate 68 are formed to provide an expansible chamber 73 which is supplied with fluid by the brake line 74 to release the brake 42.

The clutch line 76 has a portion 78 in the housing 67 and a portion 79 in an inner housing portion 81. A tubular connector 82 bridges the parting line between the housing portions 67 and 81 and is sealed at both ends to the clutch line portions 78 and 79. A plug 83 secures a spring 84 in the passage 78 to hold the connector 82 against a shoulder in the passage 79.

Hydraulic System

The hydraulic system is supplied with fluid from an input shaft or an output shaft driven pump 87 which supplies the main line 88. The main line 88 has a branch connected to the pressure regulator valve 89 to regulate the pressure in main line 88 and exhaust the excess to the lubricating line 61. The pressure regulator valve 89 has a valve element 91 located in a bore 92. The spring 93 positioned in the bore by the plug 94 biases the valve element 91 upwardly to the closed position. When the pressure in main line 88 rises above a predetermined value the pressure moves the valve element 91 against the biasing force of spring 93 to open a restricted connection or orifice 96 to exhaust to the lubricating line 61 to regulate the pressure at a predetermined value. When the pump supplies an excessive volume of oil, i.e., when the oil is cold, the valve element 91 is moved down further so that the top edge 97 is below the outlet to line 61 to provide a higher volume exhaust. The spring chamber of bore 92 is vented by exhaust 98.

The lubrication line 61 is provided with a low lubrication pressure light and buzzer warning system consisting of a pressure actuated switch 101 connected to the lubrication line 61. When the lubrication pressure is below a predetermined value not normally encountered during transmission operation, the switch 101 closes completing a circuit from the battery 102 through the light 103, buzzer 104, to provide a visual and sound warning to the operator.

A check valve 100 opening at a greater pressure than switch 101 maintains pressure in line 61 at switch 101 to prevent temporary pressure fluctuations during normal operation of the transmission, caused for example by low pump capacity at idle, operating the low lubrication light and buzzer. The orifice 105 bypassing check valve 100 provides after a predetermined time delay equalization of pressure in line 61 on both sides of valve 100 so that any persistent loss of pressure due to a malfunction of the transmission will operate the low lubrication light and buzzer. It will be appreciated that signals 103 and 104, in indicating low pressure in line 61 between regulator valve 89 and check or relief valve 100 with orifice 105, will not only indicate low pressure in line 61 but a lack of exhaust flow from valve 89 which would indicate the pressure in main line 88 is lower than the normal regulated value.

The clutch 41 and brake 42 are manually controlled by a solenoid operated valve 106. The valve 106 is actuated by a manual switch 108 preferably located on the gear shift lever 109 for the manual transmission. The switch 108 completes a circuit from the battery 111 to actuate or energize the solenoid 112 which is connected by a stem 114 to the valve 106 to move valve element 116 down to the direct drive position shown. The conventional solenoid return spring moves the valve element 116 up to the overdrive position when switch 108 is opened. Valve 106 has a valve element 116 having lands a and b slidably mounted in a bore 117. In this position the valve element 116 connects main line 88 between lands a and b to transfer line 121 and to pressure control line 122. A wire 123 is located in line 122 having a diameter slightly less than the diameter of the bore forming the line to provide an orifice in this line. The pressure control valve 126 has a valve element 127 having lands a and b of equal diameter located in the bore 128. A spring 129 biases the valve element 127 to the upper position. The control line 122 is connected to the upper end of the bore 128 at all times to provide a pressure to move valve element 127 to the connecting position, as shown, connecting transfer line 121 to the brake release line 74 and clutch apply line 76. The lower end of both valve bores 128 and 117 is vented by the exhaust 131.

The brake release line 74 is connected at all times through the restricting orifice 133 to the clutch apply line 76. During the supply of fluid through the brake release line 74 and the clutch apply line 76, the fluid is line 74 will open the check valve 134 at a predetermined pressure differential across orifice 133 at which brake 42 is released and clutch 41 is not engaged to supply a greater volume of flow to the clutch apply line 76. During release of the clutch 41 the check valve 136 will open at a very low pressure to prevent fluid being trapped in the direct clutch 41, if the orifice 133 becomes plugged.

*Operation*

Under conditions of operation where fluid is not supplied to the clutch 41 and brake 42, when valve element 116 is in the closed or overdrive position under manual control or conditions of failure of the electric system or when the hydraulic system supplying fluid fails or is cut off by valve 127 due to low pressure, the spring actuated brake 42 will engage to place the transmission in overdrive. The brake 42 holds the sun gear 38 stationary so that the input drive to the carrier 32 rotates the output shaft 36 at an overdrive ratio. Thus, a failure of either the hydraulic or electrical portion of the control system will not prevent operation of the vehicle since overdrive will be engaged.

To obtain overdrive the switch 108 is placed in the disconnect position, de-energizing solenoid 112 to permit the normal return or biasing force, generally provided by a spring in the solenoid 112, to lift valve 116 from the the direct drive position shown upwardly to the overdrive position. In the overdrive position the valve element 116 connects transfer line 121 to exhaust 131 and main line 88 to pressure control line 122 to maintain the valve 127 in the down or connecting position shown. Thus, the brake release line 74 and the clutch apply line 76 are connected between the lands of valve element 127 and transfer line 121 to exhaust 131 to disengage the direct drive clutch 41 and permit the spring 69 to engage the overdrive brake 42. In overdrive, if the main line pressure falls below a predetermined minimum considered desirable for proper operation to disengage the brake 42 and to engage the clutch 41, the spring 129 would move the valve element 127 upwardly to the disconnecting position to connect both the brake release line 74 and the clutch apply line 76 to the exhaust 131 to permit the spring 69 to positively engage brake 42 for overdrive and to prevent on a subsequent shift to direct drive any partial release of brake 42 or application of clutch 41 by inadequate fluid pressure which would cause undesirable slipping as explained below.

When the operator wishes to shift to direct drive the switch 108 is closed to energize solenoid 112 to move the valve element 116 down to the position shown, the direct drive position. The valve 116 maintains the connection of the main line 88 having a pressure, i.e., of 60 p.s.i. via pressure control line 122 to bore 128 to hold valve element 127 in the connecting position shown so that the main line is also connected through valve 116, transfer line 121 and by valve 127 to the brake release line 74 and the clutch apply line 76. A predetermined low pressure, i.e., 20 p.s.i., in the brake release chamber 73 will reduce the capacity of the brake 42 to zero disestablishing overdrive and a higher predetermined pressure, i.e., 35 p.s.i., will engage clutch 41 at maximum torque loads. Both pressures will be proportionally lower at lower torque loads. When the valve element 116 is initially shifted into the direct drive position shown, a large volume of fluid flows through the unrestricted brake release line 74 to quickly increase the pressure in brake release chamber 73 because orifice 133 and closed valve 134 limits flow to clutch apply chamber 60. At a predetermined low pressure, i.e., 20 p.s.i., the brake capacity is reduced to zero to disengage overdrive. At the same time a small volume of oil flows from line 74 through orifice 133 to line 76 to the clutch apply chamber 60. However, due to the pressure drop and flow restriction across orifice 133 and the higher pressure, i.e., 35 p.s.i., required to engage clutch 41 for drive under all conditions of operation and provide the normal factor of safety, the pressure in and the volume of fluid supplied to the clutch apply chamber 60 is only sufficient to start moving the clutch piston 54 toward engagement but insufficient to actually engage clutch 41 to provide drive at the time of brake disengagement. When the brake 42 is disengaged the engine is free to speed up. When the brake is disengaged, the pressure differential across orifice 133 is a slightly higher predetermined value, indicating that the brake is released. This predetermined pressure differential across the orifice 133 opens check valve 134 to provide a larger measured volume of flow through the orifice 133 and the check valve 134 to build up at a timed rate to a higher pressure, i.e., 30 to 35 p.s.i., depending on the torque being transmitted to cause the direct clutch 41 to move into drive engagement a predetermined time after the disengagement of brake 42 or at the proper time, when the engine has speeded up in an amount equal to the change of engine speed required to equal the ratio change effected by the planetary transmission so that there is no shock on engagement of the direct drive clutch 41. Orifice 133 equalizes the pressure across check valve 134 so line pressure is supplied to clutch apply chamber 60 when the clutch is fully engaged. If the main line pressure should fall below the higher predetermined value, i.e., 35 p.s.i., considered necessary for proper actuation of the clutch and brake when the transmission is shifted into or operating in direct drive, the spring 129 will overcome the main line pressure acting on the upper end of valve element 127 to connect line 74 and line 76 to exhaust 131 to permit the spring 69 to establish overdrive. The orifice formed by wire 123 in line 122 prevents momentary pressure surges from operating valve 127.

When the operator wishes to make a shift to overdrive the switch 108 is opened de-energizing solenoid 112 permitting the biasing force to move the valve 116 upwardly so that brake release line 74 is directly connected through valve bore 128 to exhaust 131 and clutch apply line 76 is connected through orifice 133 to exhaust 131. In making this shift, it will be appreciated that the brake apply spring 69 collapses chamber 73 and, acting as an accumulator, forces oil through the brake release line 74 at an intermediate pressure. Since oil exhausting from the clutch apply chamber 60 is at a lower pressure because the return biasing force on clutch piston 54 is less and the oil must pass through orifice 133, there is some delay in releasing the clutch to provide overlap on the shift from direct to overdrive to prevent engine runaway. The clutch return biasing force is sufficient to provide a pressure in line 76 to open the very low pressure check valve 136 to permit exhaust of the clutch cylinder if orifice 133 is clogged.

The above described embodiment of the invention may be modified within the scope of the appended claims.

I claim:

1. In a transmission, a gear unit providing a first and a second ratio drive, means normally biased to actuate said gear unit to establish said first ratio, fluid operated release means operative at a predetermined low pressure to complete disengagement of said first drive at normal torque values in response to a predetermined low pressure, fluid operated apply means inoperative at said predetermined low pressure and operative at said normal torque values at a predetermined high pressure to complete establishment of said second drive, a source of fluid under pressure, means to regulate the pressure of said source at a normally constant value above said predetermined high pressure, shift valve means operative in a first position to connect said source to said fluid operated release means and said fluid operated apply means and operative in a second position to connect said fluid operated release means and said fluid operated apply means to exhaust, and means to provide a low volume supply of fluid from said shift valve means to said fluid operated apply means when the fluid pressure in said fluid operated release means is below said predetermined low pressure and a high volume supply of fluid from said shift valve means to said fluid operated apply means when the fluid pressure in said fluid operated release means is above said predetermined low pressure at which said fluid operated release means completes disengagement of said first drive.

2. In a transmission, a gear unit providing a first and a second ratio drive, means normally biased to actuate said gear unit to establish said first ratio, fluid operated release means operative at a predetermined low pressure to completely disengage said first drive in response to a predetermined low pressure, fluid operated apply means inoperative at said predetermined low pressure and operative at a predetermined high pressure to completely establish said second drive, a source of fluid under pressure, means to regulate the pressure of said source at a normally constant value above said predetermined high pressure, shift valve means operative in a first position to connect said source to said fluid operated release means and said fluid operated apply means and operative in a second position to connect said fluid operated release means and said fluid operated apply means to exhaust, and means operative in response to pressure supplied by said source of a pressure value less than said predetermined high pressure for preventing the supply of fluid from said source to said fluid operated release means and said fluid operated apply means.

3. The invention defined in claim 2 and means to indicate to the operator when the pressure of said source is less than said predetermined high pressure and means to delay operation of said means to prevent indication of momentary pressure surges.

4. In a transmission control system, a source of fluid providing a regulated high pressure and a low pressure, a friction device to establish a drive, fluid operated means operative on said friction device to establish said drive, conencting means connecting said high and low pressure of said source to said fluid operated means to establish and disestablish said drive, indicating means connected to said low pressure to indicate to the operator whether said high pressure of said source is sufficient to properly actuate said friction device without unnecessary slippage.

5. The invention defined in claim 4 and said indicating means including a pressure sensitive indicator connected to said connecting means and a low pressure check valve preventing return flow through said connecting means and a small by-pass orifice around said check valve.

6. In a transmission, a gear unit providing a first and a second ratio drive, means normally biased to actuate said gear unit to establish said first ratio, fluid operated release means operative to substantially completely disengage said first drive in response to a predetermined low pressure, fluid operated apply means inoperative in response to said predetermined low pressure and operative to substantially completely establish said second drive in response to a predetermined high pressure, a source of fluid under pressure, means to regulate the pressure of said source at a normally constant value, shift valve means operative in a first position to connect said source to said fluid operated release means and said fluid operated apply means and operative in a second position to connect said fluid operated release means and said fluid operated apply means to exhaust, means operative in response to pressure of said source of a pressure value less than said predetermined high pressure for preventing the supply of fluid to said fluid operated release means and said fluid operated apply means, and means to provide a low volume supply of fluid from said shift valve means to said fluid operated apply means when the fluid pressure in said fluid operated release means is below said predetermined low pressure and a high volume supply of fluid from said shift valve means to said fluid operated apply means when the fluid pressure in said fluid operated release means is above said predetermined low pressure at which said fluid operated release means substantially completely disengages said first drive.

7. In a transmission, a gear unit providing a first and a second ratio drive, means normally biased to actuate said gear unit to establish said first ratio, fluid operated release means operative at a predetermined low pressure to disengage said first drive in response to a predetermined low pressure, fluid operated apply means inoperative in response to said preedtermined low pressure and operative in response to a predetermined high pressure to establish said second drive, a source of fluid under pressure, means to regulate the pressure of said source at a normally constant value above said predetermined high pressure, shift valve means operative in a first position to connect said source to said fluid operated release means and said fluid operated apply means and operative in a second position to connect said fluid operated release means and said fluid operated apply means to exhaust, means operative in response to the pressure supplied by said source to disconnect the supply of fluid to said fluid operated release means and said fluid operated apply means when the pressure of said source is less than said predetermined high pressure, and means to provide a low volume supply of fluid from said shift valve means to said fluid operated apply means when the fluid pressure in said fluid operated release means is below said predetermined low pressure and a high volume supply of fluid from said shift valve means to said fluid operated apply means when the fluid pressure in said fluid operated release means is above said predetermined low pressure at which said fluid operated release means disengages said first drive.

8. In a transmission; a gear unit providing a first and a second drive device; first drive control means having fluid operated release means operative by a predetermined low actuating pressure to disengage said first drive in response to a predetermined low actuating pressure, and first biasing means normally biasing said fluid operated release means to actuate said gear unit to establish said first drive and to provide a high exhaust pressure from said fluid operated release means during establishment of said first drive; second drive control means having fluid operated apply means inoperative in response to said predetermined low actuating pressure and operative in response to a predetermined high actuating pressure to establish said second drive, and second biasing means biasing said fluid operated apply means to a release position providing a low exhaust pressure from said fluid operated apply means; a source of fluid under pressure; means to regulate the pressure of said source at a normally constant value above said predetermined high actuating pressure, shift valve means operative in a first position to connect said source to said fluid operated release means and said fluid operated apply means and operative in a second position to connect said fluid operated release means and said fluid operated apply means to exhaust; and means actuated by said high exhaust pressure from said fluid operated release means to delay exhaust of and disengagement of said fluid operated apply means.

9. In a transmission; a gear unit providing a first and a second ratio device, first drive control means having fluid operated release means operative by a predetermined low actuating pressure to completely disengage said first drive in response to a predetermined low actuating pressure, and first biasing means normally biased to actuate said gear unit to establish said first ratio and to provide a high exhaust pressure from said fluid operated release means; second drive control means having fluid operated apply means inoperative in response to said predetermined low actuating pressure and operative in response to a predetermined high actuating pressure to establish said second drive, and second biasing means biasing said fluid operated means to a release position providing a low exhaust pressure from said fluid operated apply means; a source of fluid under pressure; means to regulate the pressure of said source at a normally constant value above said predetermined high actuating pressure; shift valve means operative in a first position to connect said source to said fluid operated release means and said fluid operated apply means and operative in a second position to connect said fluid operated release means and said fluid operated apply means to exhaust; means to provide a low volume supply of fluid from said shift valve means to said fluid operated apply means when the fluid pressure in said fluid operated release means is below said predetermined low actuating pressure and a high volume supply of fluid from said shift valve means to said fluid operated apply means when the fluid pressure in said fluid operated release means is above said predetermined low actuating pressure at which said fluid operated release means disengages said first drive; and means actuated by said high exhaust pressure from said fluid operated release means to delay exhaust of and disengagement of said fluid operated apply means until said fluid operated release means permits engagement of said first drive.

10. In a transmission; a gear unit providing a first and a second ratio device; first drive control means having fluid operated release means operative by a predetermined low actuating pressure to disengage said first drive in response to a predetermined low actuating pressure, and first biasing means normally biased to actuate said gear unit to establish said first ratio and to provide a high exhaust pressure from said fluid operated release means; second drive control means having fluid operated apply means inoperative in response to said predetermined low actuating pressure and operative in response to a predetermined high actuating pressure to establish said second drive, and second biasing means biasing said fluid operated means to a release position providing a low exhaust pressure from said fluid operated apply means; a source of fluid under pressure; means to regulate the pressure of said source at a normally constant value above said predetermined high actuating pressure; shift valve means operative in a first position to connect said source to said fluid operated release means and said fluid operated apply means and operative in a second position to connect said fluid operated release means and said fluid operated apply means to exhaust; means operative in response to pressure supplied from said source to disconnect the supply of fluid to said fluid operated release means and said fluid operated apply means when the pressure supply of said source is insufficient to provide said predetermined high actuating pressure; means to provide a low volume supply of fluid from said shift valve means to said fluid operated apply means when the fluid pressure in said fluid operated release means is below said predetermined low pressure and a high volume supply of fluid from said shift valve means to said fluid operated apply means when the fluid pressure in said fluid operated release means is above said predetermined low pressure at which said fluid operated release means disengages said first drive; and means actuated by said high exhaust pressure from said fluid operated release means to delay exhaust of and disengagement of said fluid operated apply means until said fluid operated release means substantially permits engagement of said first drive.

11. In a transmission, a gear unit providing a first and a second ratio drive, biasing means to establish said first drive, fluid pressure operated release means operative at a predetermined pressure to disengage said first drive in response to a predetermined pressure, fluid operated apply means inoperative at said predetermined pressure and operative at a higher pressure to establish said second drive, a source of fluid under pressure, a release line connected to said fluid operated release means, an apply line connected to said fluid operated apply means, shift valve means operative in a first position to connect said source to said release line and said apply line and operative in a second position to connect said release line and said apply line to exhaust, orifice means in said apply line constantly open to provide a restricted connection between said shift valve means and said fluid operated apply means, and a check valve arranged in parallel with said orifice means in said apply line to provide a one-way connection from said shift valve means to said fluid operated apply means opening at said predetermined pressure at which said fluid operated release means disengages said first drive.

12. The invention defined in claim 11, and a second check valve arranged in parallel with said orifice opening under a lower pressure to provide a one-way connection from said fluid operated apply means to said shift valve means.

13. In a transmission, a gear unit providing a first and a second ratio drive, biasing means to establish said first drive, fluid pressure operated release means operative at a predetermined pressure to disengage said first drive in response to a first predetermined pressure, fluid operated apply means to establish said second drive in response to a second predetermined pressure, a source of fluid under pressure, means to regulate the pressure of said source at a constant value, a pressure control line, a transfer line, shift valve means operative in a first position to connect said source to said pressure control line and operative in a second position to connect said source to said pressure control line and said transfer line, a release line connected to said fluid operated release means, an apply line connected to said fluid operated apply means, and a pressure controlled valve connected to said release line and connected to said apply line biased to a first position connecting said release line and said apply line to exhaust and having means responsive to the pressure in said pressure control line when said source of pressure is sufficient to provide said second predetermined pressure to move said valve to a second position connecting said transfer line to said release line and said fluid operated release means and to said apply line and said fluid operated apply means.

14. In a transmission, a gear unit providing a first and a second ratio drive, biasing means to establish said first drive, fluid pressure operated release means operative at a predetermined pressure to disengage said first drive in response to a predetermined low pressure, fluid operated apply means inoperative to establish said second drive at said predetermined low pressure and operative to establish said second drive at a predetermined high pressure, a source of fluid under pressure, means to regulate the pressure of said source at a constant value higher than said predetermined high pressure, a pressure control line, a transfer line, shift valve means operative in a first position to connect said source to said pressure control line and operative in a second position to connect said source to said pressure control line and said transfer line, a release line connected to said fluid operated release means, an apply line connected to said fluid operated apply means, a pressure controlled valve connected to said release line and connected to said apply line biased to a first position connecting said release line and said apply line to exhaust and having means responsive to a pressure providing in said second fluid operated means a pressure above said predetermined high pressure in said pressure control line to move said valve to a second position connecting said transfer line to said release line and said fluid operated release means and to said apply line and said fluid operated apply means, orifice means in said apply line constantly open to provide a restricted connection between said pressure controlled valve and said fluid operated apply means, and a check valve arranged in parallel with said orifice means in said apply line to provide a one-way connection from said pressure controlled valve to said fluid operated apply means opening at said predetermined low pressure at which said fluid operated release means disengages said first drive.

15. In a transmission, a gear unit providing a first and a second ratio drive, spring operated means to establish said first drive, fluid pressure operated release means operative at a predetermined pressure to disengage said first drive in response to a predetermined pressure, fluid operated apply means to establish said second drive, a source of fluid under pressure, means to regulate the pressure of said source at a constant value, a pressure control line, a transfer line, shift valve means operative in a first position to connect said source to said pressure control line and operative in a second position to connect said source to said pressure control line and said transfer line, a release line connected to said fluid operated release means, an apply line connected to said fluid operated apply means, a pressure controlled valve connected to said release line and connected to said apply line biased to a first position connecting said release line and said apply line to exhaust and having means responsive to the pressure in said pressure control line to move said valve to a second position connecting said transfer line to said release line and said fluid operated release means and to said apply line and said fluid operated apply means, orifice means in said apply line constantly open to provide a restricted connection between said pressure controlled valve and said fluid operated apply means, a first check valve arranged in parallel with said orifice means in said apply line to provide a connection from said pressure controlled valve to said fluid operated apply means opening at said predetermined pressure at which said fluid operated release means disengages said first drive, and a second check valve arranged in parallel with said orifice opening under a lower pressure to connect said fluid operated apply means to said pressure controlled valve.

16. In a transmission, a gear unit providing a first and a second ratio drive, spring operated means to establish said first drive, fluid pressure operated release means operative at a predetermined pressure to disengage said first drive in response to a predetermined pressure, fluid operated apply means to establish said second drive, a source of fluid under pressure, means to regulate the pressure of said source at a constant value, a pressure control line, a transfer line, shift valve means operative in a first position to connect said source to said pressure control line and operative in a second position to connect said source to said pressure control line and said transfer line, a release line connected to said fluid operated release means, and apply line connected to said fluid operated apply means, a pressure controlled valve connected by said release line and connected by said apply line biased to a first position connecting said release line and said apply line to exhaust and having means responsive to the pressure in said pressure control line to move said valve to a second position connecting said transfer line to said release line and said fluid operated release means and said apply line and said fluid operated apply means, means in said apply line to provide a low volume supply of fluid from said pressure controlled valve to said fluid operated apply means below said predetermined pressure and to provide a high volume supply of fluid from said pressure controlled valve to said fluid operated apply means above said predetermined pressure at which said fluid operated release means disengages said first drive.

17. In a transmission, a fluid operated drive engaging device operative in response to fluid pressure to engage and disengage said drive and requiring a predetermined high actuating pressure to fully disengage and engage said device for normal drive without slip, a source of fluid under pressure, control means selectively connecting said source to said fluid operated drive engaging device to actuate said drive engaging device and including a pressure responsive cutoff valve operative when the pressure of said source is below a pressure sufficient to provide said predetermined high actuating pressure in said fluid operated drive engaging device to cut off the flow of fluid from said source through said control means to said fluid operated drive device to prevent partial operation of said device and operative only when the pressure of said source is sufficient to provide said predetermined high actuating pressure in said device to permit flow of fluid from said source through said control means to said fluid operated drive device for full actuation of said fluid operated drive device.

18. The invention defined in claim 17 and said control means including a control valve operative in one position to connect said source to a control port and a supply port and operative in another position to connect said source to said control port and to connect said supply port to exhaust and said cutoff valve being located between said control valve and said fluid operated device and normally biased to a cutoff position connecting said fluid operated device to exhaust and having means responsive to a pressure in said control port sufficient to provide said predetermined actuating pressure in said fluid operated device to move said cutoff valve to open position connecting said supply port to said fluid operated device.

19. In a transmission control system, a source of fluid, a friction device to establish a drive, fluid operated means operatively connected to said friction device to establish said drive, connecting means connecting said source to said fluid operated means to actuate said fluid operated means for controlling said friction device and including a connection having a pressure check valve retaining fluid in said connecting means at a predetermined pressure between said source and said pressure check valve and a bypass orifice around said pressure check valve, and indicating means connected to said connecting means between said check valve and source providing a signal when the pressure in said connecting means decreases below said predetermined pressure to indicate insufficient operating pressure in the system for a significant time.

20. In a transmission, a plurality of fluid operated drive engaging devices requiring a predetermined minimum fluid pressure value for transmission of normal operating torque without slip, a source of fluid under pressure, a supply line means connecting said source to said fluid operated drive engaging devices, shift valve means in said supply line selectively operable to connect said source through said supply line means to selectively operate said fluid operated drive engaging devices, and a pressure controlled valve connected to said supply line between said source and said fluid operated drive engaging devices operative to permit supply of fluid from said source to said fluid operated drive engaging devices when the pressure of said source is at or exceeds said predetermined minimum fluid pressure value and operative when the pressure of said source is below said predetermined minimum fluid pressure value to prevent the supply of fluid from said source to all of said fluid operated drive engaging devices.

21. In a transmission, a fluid operated drive engaging device requiring a predetermined high minimum pressure value to fully engage said fluid operated drive engaging device to provide a drive without slip, a source of fluid under pressure normally providing a fluid pressure at least as high as said predetermined high pressure value, shift valve means connecting said source to said fluid operated drive engaging device operative to control the supply of fluid from said source to said device to vary the pressure in said device between a low value and said predetermined high minimum pressure value for disengagement and engagement of said drive with slip during the change in pressure in said device, and pressure controlled valve means connected to said shift valve means between said source and said fluid operated drive engaging device operative to permit supply of fluid from said source to said fluid operated drive engaging device to vary the pressure in said device between said low pressure value and said predetermined high minimum pressure value only when the pressure of said source is at least as high as said predetermined high minimum pressure value to fully engage said fluid operated drive engaging device without slip, and operative when the pressure of said source is below said predetermined high minimum pressure value to prevent the supply of any fluid from said source to said fluid operated drive engaging device by said shift valve means when the pressure of said source is less than said high minimum pressure value to prevent continuing partial slipping engagement of said fluid operated drive engaging device due to failure of said source.

22. The invention defined in claim 21 and said shift valve means supplying fluid to said fluid operated drive engaging device to engage said device.

23. The invention defined in claim 21 and said shift valve means supplying fluid to said fluid operated drive engaging device to disengage said device.

24. In a transmission, a fluid operated drive engaging device operable on the supply of fluid initially at a low pressure and gradually raising the pressure to softly engage the drive and then raising the pressure to a sufficiently high value to transmit the maximum drive without slip, a source of fluid under pressure, a supply line connected to said fluid operated drive engaging device, shift valve means in said supply line being open in one position for connecting said source to said fluid operated drive engaging device to actuate said device to engage said drive and operative in a second position to block the flow of fluid to said device and to exhaust said device to disengage said drive, means in said supply line operable on the initial supply of fluid to said fluid operated drive engaging device to supply a low pressure to said device and to gradually raise the pressure in said device for softly engaging said drive with slip and then to raise the pressure to said sufficiently high value for maximum drive without slip, and pressure controlled valve means connected to said supply line between said source and said fluid operated drive engaging device operative to permit supply of fluid from said source to said fluid operated drive engaging device to vary the pressure in said device between said low pressure value and said sufficiently high value only when the pressure of said source is at least as high as said sufficiently high value to fully engage said fluid operated drive engaging device without slip, and operative when the pressure of said source is below said sufficiently high value to prevent the supply of any fluid from said source to said fluid operated drive engaging device by said supply line when the pressure of said source is less than said sufficiently high value to prevent continuing partial slipping engagement of said fluid operated drive engaging device due to failure of said source.

25. In a transmission control system, a source of fluid, regulator valve means regulating the pressure of said source and having an exhaust passage operative to control the pressure of said source at a predetermined regulated value by exhausting the excess fluid to said exhaust passage, a friction device to establish a drive, fluid operated means operatively connected to said friction device to actuate said drive device, control means connecting said source to said fluid operated means to actuate said fluid operated means, and flow measuring means including metering means and indicating means responsive to the exhaust flow of fluid through said exhaust passage for measuring and indicating only the presence of significant exhaust flow and the absence of significant exhaust flow to indicate respectively that said regulator valve means is regulating the pressure of said source at said predetermined regulated value and that said regulator valve means is not regulating the pressure of said source at said predetermined regulated value and the pressure of said source is less than said predetermined regulated value.

26. In a transmission control system, a source of fluid, a regulator regulating the pressure of said source and having an exhaust passage operative to control the pressure of said source at a predetermined regulated value by exhausting the excess fluid to said exhaust passage, a friction device to establish a drive, fluid operated means operatively connected to said friction device to actuate said drive device, control means connecting said source to said fluid operated means to actuate said fluid operated means, and indicating means including a relief valve and bypass orifice connecting said exhaust passage to exhaust and pressure responsive means in said exhaust passage operative in response to pressure created by said relief valve and bypass orifice during exhaust flow of fluid through said exhaust passage to indicate the presence of exhaust flow and that said source is being regulated at said predetermined regulated value and indicating the absence of exhaust flow and that the regulated pressure is less than said predetermined regulated value.

References Cited in the file of this patent

UNITED STATES PATENTS

| | | |
|---|---|---|
| 2,122,402 | Bailey | July 5, 1938 |
| 2,529,423 | Schou | Nov. 7, 1950 |
| 2,598,633 | Baldwin | May 27, 1952 |
| 2,697,363 | Sheppard | Dec. 21, 1954 |
| 2,807,968 | Forster | Oct. 1, 1957 |
| 2,873,618 | De Lorean | Feb. 17, 1959 |
| 2,908,158 | Jacobsson | Oct. 13, 1959 |
| 2,919,597 | Borman | Jan. 5, 1960 |
| 2,936,000 | Mason | May 10, 1960 |
| 2,995,957 | Wilson et al. | Aug. 15, 1961 |
| 3,003,368 | Winchell | Oct. 10, 1961 |

OTHER REFERENCES

"Automatic Transmissions," in Automotive Industries, Aug. 15, 1950, pages 46, 102, 104, 106, 108 110.